United States Patent
Fujikane et al.

(10) Patent No.: US 9,708,201 B2
(45) Date of Patent: *Jul. 18, 2017

(54) LIQUID TREATMENT APPARATUS

(71) Applicant: Panasonic Intellectual Property Management Co., Ltd., Osaka (JP)

(72) Inventors: Masaki Fujikane, Osaka (JP); Mari Onodera, Osaka (JP); Shin-Ichi Imai, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 16 days.

This patent is subject to a terminal disclaimer.

(21) Appl. No.: 14/530,741

(22) Filed: Nov. 1, 2014

(65) Prior Publication Data

US 2015/0139863 A1 May 21, 2015

(30) Foreign Application Priority Data

Nov. 18, 2013 (JP) .................. 2013-238040

(51) Int. Cl.
*B01J 19/08* (2006.01)
*C02F 1/46* (2006.01)
(Continued)

(52) U.S. Cl.
CPC .......... *C02F 1/4608* (2013.01); *C02F 1/4672* (2013.01); *C02F 2001/46142* (2013.01);
(Continued)

(58) Field of Classification Search
CPC .......... C02F 1/4608; C02F 2001/46142; C02F 2001/46171; C02F 2201/46105;
(Continued)

(56) References Cited

U.S. PATENT DOCUMENTS 5,464,513 A 11/1995 Goriachev et al.
5,630,915 A 5/1997 Greene et al.
(Continued)

FOREIGN PATENT DOCUMENTS

CN 1583589 2/2005
EP 2072471 6/2009
(Continued)

OTHER PUBLICATIONS

English Translation of Chinese Search Report dated Feb. 22, 2016 for the related Chinese Patent Application No. 201410616242.3.
(Continued)

*Primary Examiner* — Xiuyu Tai
(74) *Attorney, Agent, or Firm* — McDermott Will & Emery LLP (57) ABSTRACT

A liquid treatment apparatus includes a dielectric tube through which water to be treated flows, a first electrode, at least one end of which is dispose in the dielectric tube, and a second electrode made of a conductive metallic material, at least one end of the second electrode being disposed in the dielectric tube and on an upstream side of a flow pass of the water relative to the first electrode. The conductive metallic material of the second electrode is adapted to be in direct contact with the water to be treated. The liquid treatment apparatus also includes a power supply for applying a voltage between the first electrode and the second electrode, and a heat-resistant member covering at least a portion of an inner wall face of the dielectric tube. The portion of the inner wall faces the first electrode.

19 Claims, 3 Drawing Sheets

(51) Int. Cl.
    *C02F 1/461*    (2006.01)
    *C02F 1/467*    (2006.01)
(52) U.S. Cl.
    CPC ............... *C02F 2001/46171* (2013.01); *C02F 2201/46105* (2013.01); *C02F 2303/04* (2013.01); *C02F 2305/023* (2013.01)
(58) Field of Classification Search
    CPC .............. C02F 2305/023; C02F 1/4672; C02F 2303/04; C02F 1/34; C02F 1/4606; C02F 2305/10; C02F 2301/08; B01J 19/088; B01J 2219/0809; B01J 2219/0816; B01J 2219/083
    See application file for complete search history.

(56) References Cited

U.S. PATENT DOCUMENTS

| | | | |
|---|---|---|---|
| 5,766,447 A * | 6/1998 | Creijghton | A61L 2/02 204/164 |
| 6,390,638 B1 * | 5/2002 | Miller | G02B 6/0055 362/23.13 |
| 6,486,603 B1 | 11/2002 | Ikeuchi et al. | |
| 2004/0007539 A1 * | 1/2004 | Denes | C02F 1/4608 210/748.18 |
| 2013/0161266 A1 | 6/2013 | Chandran et al. | |
| 2013/0334955 A1 | 12/2013 | Saitoh et al. | |
| 2014/0014516 A1 | 1/2014 | Kumagai et al. | |
| 2014/0054242 A1 | 2/2014 | Imai | |
| 2014/0353223 A1 | 12/2014 | Nishimura et al. | |

FOREIGN PATENT DOCUMENTS

| | | |
|---|---|---|
| EP | 2692694 | 2/2014 |
| JP | 61-025698 | 2/1986 |
| JP | 9-507428 | 7/1997 |
| JP | 2000-093967 | 4/2000 |
| JP | 2000-237755 | 9/2000 |
| JP | 2001-102005 | 4/2001 |
| JP | 2003-059914 | 2/2003 |
| JP | 2004-143519 | 5/2004 |
| JP | 2005-058887 | 3/2005 |
| JP | 2007-007540 | 1/2007 |
| JP | 2007-207540 | 8/2007 |
| JP | 3983282 | 9/2007 |
| JP | 4041224 | 1/2008 |
| JP | 2009-190003 | 8/2009 |
| JP | 2009-255027 | 11/2009 |
| JP | 4784624 | 10/2011 |
| JP | 4784624 B | 10/2011 |
| JP | 2012-011301 | 1/2012 |
| JP | 2012-075981 | 4/2012 |
| JP | 2012-204249 | 10/2012 |
| JP | 2012-217917 | 11/2012 |
| JP | 2013-150975 | 8/2013 |
| WO | 95/18768 | 7/1995 |
| WO | 99/47230 | 9/1999 |
| WO | 2008/123749 | 10/2008 |
| WO | 2012/134350 | 10/2012 |
| WO | 2012/157248 | 11/2012 |

OTHER PUBLICATIONS

The Extended European Search Report dated Oct. 6, 2016 for the related European Patent Application No. 14854888.6.

* cited by examiner

LIQUID TREATMENT APPARATUS

CROSS REFERENCES TO RELATED APPLICATIONS

This Application claims priority to Japanese Patent Application No. 2013-238040, filed on Nov. 18, 2013, the contents of which are hereby incorporated by reference.

BACKGROUND

1. Technical Field

The present disclosure relates to a liquid treatment apparatus.

2. Description of the Related Art

Sterilizing apparatuses for treating water, such as polluted water, using plasma have been proposed. For example, Japanese Patent No. 4784624 discloses a sterilizing apparatus that includes a high-voltage electrode and a grounding electrode in water to be treated in a treatment tank. The high-voltage electrode is spaced apart by an interval from the grounding electrode. In the sterilizing apparatus, when a high voltage pulse is applied to both of the electrodes to cause discharge, plasma is generated in a gas bubble formed by an instantaneous boiling phenomenon. The plasma produces OH, H, O, $O_2^-$, $O^-$, and $H_2O_2$, which can kill microorganisms and germs.

SUMMARY

The conventional apparatus has the problem of low liquid treatment efficiency.

Accordingly, the present disclosure provides a liquid treatment apparatus that can efficiently treat liquids.

The present disclosure describes a liquid treatment apparatus including a dielectric tube through which water to be treated flows, a first electrode, at least one end of which is dispose in the dielectric tube, and a second electrode made of a conductive metallic material, at least one end of the second electrode being disposed in the dielectric tube and on an upstream side of a flow pass of the water relative to the first electrode. The conductive metallic material of the second electrode is adapted to be in direct contact with the water to be treated. The liquid treatment apparatus also includes a power supply for applying a voltage between the first electrode and the second electrode, and a heat-resistant member covering at least a portion of an inner wall face of the dielectric tube. The portion of the inner wall faces the first electrode.

A liquid treatment apparatus according to the present disclosure can efficiently treat a liquid.

Additional benefits and advantages of the disclosed embodiments will be apparent from the specification and drawings. The benefits and/or advantages may be individually provided by the various embodiments and features of the specification and drawings, and need not all be provided in order to obtain one or more of the same.

DETAILED DESCRIPTION OF THE EMBODIMENTS

A liquid treatment apparatus according to a first aspect of the present disclosure includes a dielectric tube through which a liquid flows, a first electrode, at least one end of which is disposed in the dielectric tube, a second electrode, at least one end of which is disposed in the dielectric tube, and a power supply for applying a voltage between the first electrode and the second electrode, wherein the dielectric tube has a protrusion projecting outwardly from an inside of the dielectric tube, an inner wall face of the protrusion facing the first electrode.

This structure can improve liquid treatment efficiency and allows a liquid to be treated in a short time. Because of the use of a dielectric tube in liquid treatment, the size of the apparatus can be reduced. The protrusion projecting outwardly from the inside of the dielectric tube can retard degradation of the dielectric tube caused by plasma. This can extend the life of the dielectric tube.

In the liquid treatment apparatus according to the first aspect of the present disclosure, for example, the protrusion may be a convex-shaped dome projecting outwardly.

Since the protrusion is dome-shaped with no edge, the protrusion can be easily processed.

In the liquid treatment apparatus according to the first aspect of the present disclosure, for example, a flow path in the dielectric tube may cross between one end of the first electrode disposed in the dielectric tube and the protrusion.

The structure allows a liquid flowing through the dielectric tube to dissipate heat generated between one end of the first electrode and the protrusion. For example, when a gas bubble is formed around the first electrode, the gas bubble does not stay around the first electrode and flows downstream of the dielectric tube. Thus, heat associated with plasma generation can be efficiently dissipated.

A liquid treatment apparatus according to a second aspect of the present disclosure includes a dielectric tube through which a liquid flows, a first electrode, at least one end of which is disposed in the dielectric tube, a second electrode, at least one end of which is disposed in the dielectric tube, a power supply for applying a voltage between the first electrode and the second electrode, and a heat-resistant member covering at least a portion of an inner wall face of the dielectric tube, the portion facing the first electrode.

This structure can improve liquid treatment efficiency and allows a liquid to be treated in a short time. Because of the use of a dielectric tube in liquid treatment, the size of the apparatus can be reduced. The heat-resistant member covering at least a portion of an inner wall face of the dielectric tube can retard degradation of the dielectric tube caused by plasma. This can extend the life of the dielectric tube.

In the liquid treatment apparatus according to the second aspect of the present disclosure, for example, the heat-resistant member may cover a portion of the inner wall face of the dielectric tube between the first electrode and the second electrode.

The structure can further retard degradation of the dielectric tube due to plasma generated by the application of a voltage between the first electrode and the second electrode. This can extend the life of the dielectric tube.

In the liquid treatment apparatus according to the second aspect of the present disclosure, for example, a flow path in the dielectric tube may cross between one end of the first electrode disposed in the dielectric tube and the heat-resistant member.

The structure allows a liquid flowing through the dielectric tube to dissipate heat generated between one end of the first electrode and the heat-resistant member. For example, when a gas bubble is formed around the first electrode, the gas bubble does not stay around the first electrode and flows downstream of the dielectric tube. Thus, heat associated with plasma generation can be efficiently dissipated.

In the liquid treatment apparatus according to the first or second aspect of the present disclosure, for example, the power supply may apply a voltage between the first electrode and the second electrode and generate plasma.

In the liquid treatment apparatus according to the first or second aspect of the present disclosure, for example, the power supply may apply a voltage between the first electrode and the second electrode while the first electrode is surrounded by a gas bubble formed in the water to be treated, causing discharge to generate plasma in the gas bubble.

The plasma generated in the gas bubble surrounding the first electrode in the liquid can efficiently produce radicals. Thus, the liquid can be treated in a short time.

In the liquid treatment apparatus according to the first or second aspect of the present disclosure, for example, the second electrode may be disposed upstream of the first electrode in the dielectric tube.

The structure can prevent the gas bubble formed around the first electrode from coming into contact with the second electrode. Thus, upon the application of a voltage between the first electrode and the second electrode, discharge (i.e., glow discharge) can be stably generated. Thus, the arrangement of the first electrode and the second electrode enables stable plasma generation.

The liquid treatment apparatus according to the first or second aspect of the present disclosure may further include an insulator disposed in the dielectric tube, the insulator surrounding a periphery of the first electrode with a space therebetween, the insulator having an opening through which space communicates with an internal space of the dielectric tube, and a gas supply unit which supplies a gas to the space and forms a gas bubble in the water to be treated through the opening.

The structure facilitates the production of a gas surrounding the first electrode. This enables efficient plasma generation and liquid treatment in a short time.

In the liquid treatment apparatus according to the first or second aspect of the present disclosure, for example, the first electrode may have a tubular shape with an opening through which a hollow space of the first electrode communicates with an internal space of the dielectric tube. The liquid treatment apparatus may include an insulator in contact with a peripheral surface of the first electrode, and a gas supply unit which supplies a gas to the hollow space of the first electrode and forms a gas bubble in the water to be treated through the opening.

The structure facilitates the production of a gas surrounding the first electrode. This enables efficient plasma generation and liquid treatment in a short time.

In the liquid treatment apparatus according to the first or second aspect of the present disclosure, for example, may further include an insulator disposed in the dielectric tube, the insulator surrounding a periphery of the first electrode with a space therebetween, the insulator having an opening through which the space communicates with an internal space of the dielectric tube, wherein the power supply may apply a voltage between the first electrode and the second electrode, vaporizing the water to be treated in the space to produce a gas bubble.

The structure facilitates the production of a gas surrounding the first electrode. This enables efficient plasma generation and liquid treatment in a short time.

Underlying Knowledge Forming Basis of the Present Disclosure

As described above, the known sterilizing apparatus, described in Japanese Patent No. 4784624, by causing discharge between a columnar electrode and a plate-shaped grounding electrode facing each other, instantaneously vaporizes a liquid with an instantaneous boiling phenomenon and generates plasma. However, the known sterilizing apparatus has the problem that it cannot efficiently generate plasma, and liquid treatment takes a long time, because the instantaneous boiling phenomenon requires energy to vaporize a liquid.

Furthermore, the known apparatus also has the problem that the size of the apparatus cannot be reduced because liquid treatment is performed with electrodes disposed in a treatment tank in which water to be treated is stored.

The present inventors arrived at the present disclosure by finding the structure of a liquid treatment apparatus that includes a first electrode and a second electrode in a dielectric tube, a power supply for applying a voltage between the first electrode and the second electrode, and a protrusion projecting outwardly from the inside of the dielectric tube, an inner wall face of the protrusion facing the first electrode. Because of such a structure, a liquid treatment apparatus according to the present disclosure can treat a liquid in a short time, and the size of the liquid treatment apparatus can be reduced. The protrusion projecting outwardly from the site of plasma generation can retard degradation of the dielectric tube by plasma. This can extend the life of the dielectric tube.

Embodiments of the present disclosure will be described below with reference to the accompanying drawings. Like parts are denoted by like reference numerals throughout these figures and sometimes will not be described again.

The following embodiments are comprehensive or specific embodiments. The numerical values, shapes, materials, components, and arrangement and connection of the components in the following embodiments are only examples and are not intended to limit the present disclosure. Among the components in the following embodiments, components not described in the independent claims are described as optional components.

First Embodiment

<Liquid Treatment Apparatus>

The structure of a liquid treatment apparatus 100 according to a first embodiment of the present disclosure will be described below.

Figure 1:
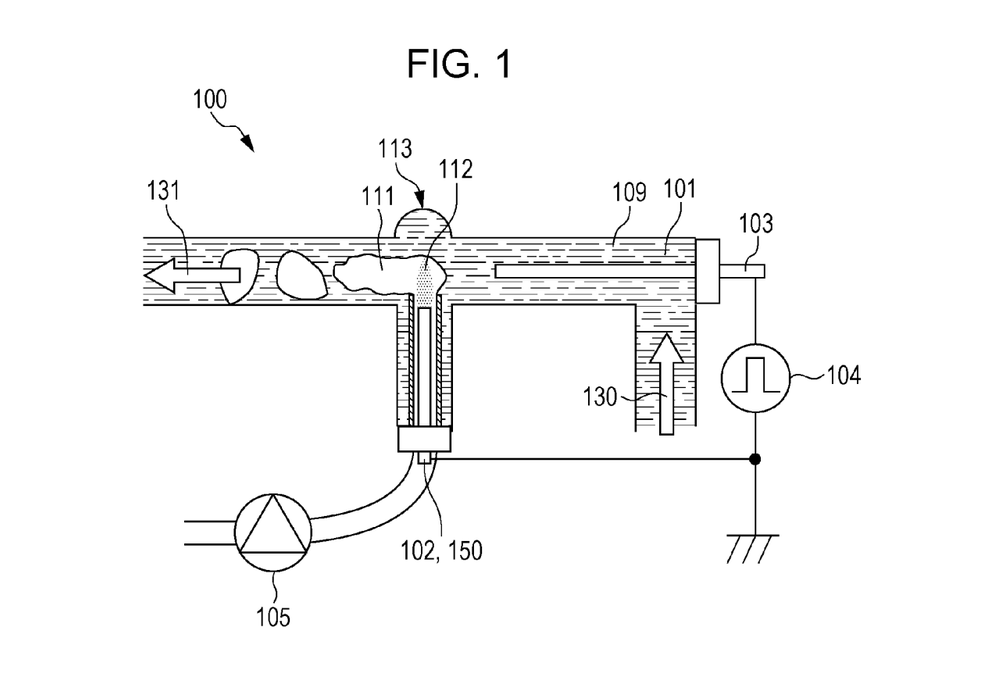
FIG. 1 is a schematic view of an exemplary entire structure of a liquid treatment apparatus according to a first embodiment of the present disclosure.

FIG. 1 is a schematic view of the exemplary structure of the liquid treatment apparatus 100 according to the first embodiment of the present disclosure. As illustrated in FIG. 1, the liquid treatment apparatus 100 includes a dielectric tube 101, a first electrode 102, a second electrode 103, a power supply 104, and a gas supply unit 105. The dielectric tube 101 includes a convex-shaped dome 113 projecting outwardly from the inside of the dielectric tube 101. An inner wall face of the convex-shaped dome 113 faces the first electrode 102. The inner wall face of the convex-shaped dome 113 may be a concave portion of the inner wall face of the dielectric tube 101.

As illustrated in FIG. 1, the liquid treatment apparatus 100 according to the first embodiment includes the first electrode 102 and the second electrode 103 in the dielectric tube 101. At least part of the first electrode 102 is immersed in water to be treated 109 in the dielectric tube 101. At least part of the second electrode 103 is immersed in the water to be treated 109 in the dielectric tube 101. The power supply 104 for applying a voltage is coupled between the first electrode 102 and the second electrode 103. The first electrode 102 is coupled to the gas supply unit 105 for supplying a gas 110 such that the gas 110 surrounds the first electrode 102 in the dielectric tube 101.

In the present disclosure, the term "water to be treated" refers to a liquid to be treated in a liquid treatment apparatus. Typically, water to be treated contains a germ and/or a chemical substance, such as an organic substance. Water to be treated does not necessarily contain germs and/or chemical substances. In the present disclosure, the phrase "treat a liquid" refers to not only killing a germ in the liquid and decomposing a chemical substance in the liquid but also forming radicals in a liquid free of germs and chemical substances.

This structure can improve the treatment efficiency of the water to be treated 109 and enables treatment of the water to be treated 109 in a short time. Since the water to be treated 109 is treated in the dielectric tube 101, the size of the apparatus can be reduced. The convex-shaped dome 113 projecting outwardly from the inside of the dielectric tube 101 can retard degradation of the dielectric tube 101 caused by plasma 112. This can extend the life of the dielectric tube 101.

<Structure of Electrode Unit>

Figure 2:
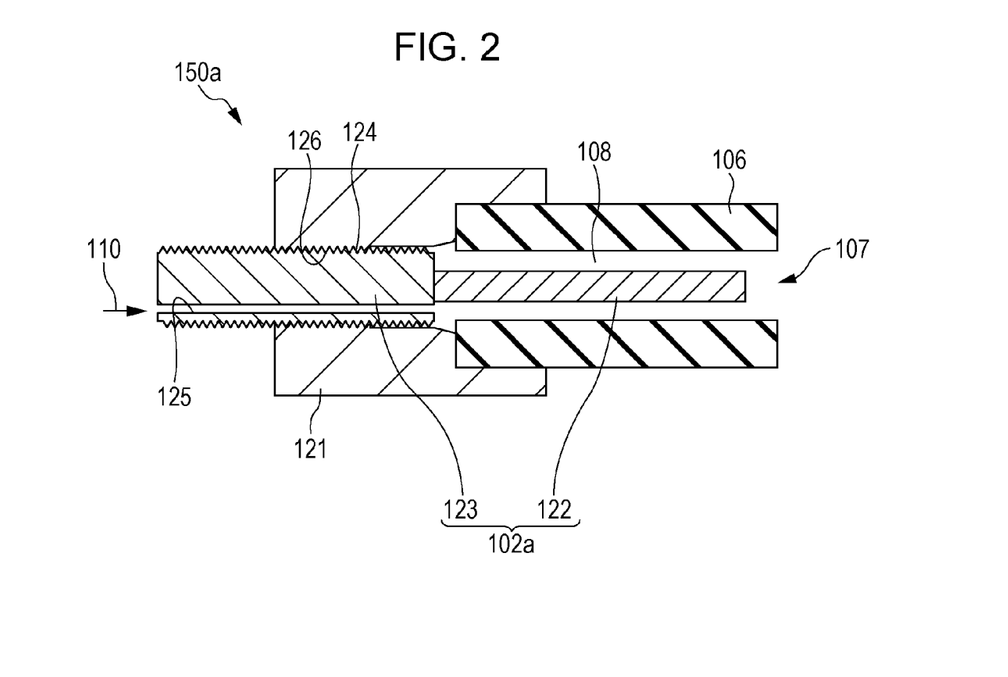
FIG. 2 is a cross-sectional view of an exemplary electrode unit that includes a first electrode in the liquid treatment apparatus according to the first embodiment of the present disclosure.

An electrode unit 150a that includes the first electrode 102 in the liquid treatment apparatus 100 according to the first embodiment will be described below. The electrode unit 150a may have a simple structure that includes the first electrode 102 alone. The electrode unit 150a may have another structure. For example, the electrode unit 150a may include an insulator 106 around the first electrode 102. The electrode unit 150a that includes the insulator 106 surrounding the first electrode 102a with a space 103 therebetween will be described below.

FIG. 2 is a cross-sectional view of an exemplary electrode unit 150a in the liquid treatment apparatus 100 according to the first embodiment. As illustrated in FIG. 2, the electrode unit 150a includes the first electrode 102a, the insulator 106, and a holding block 121.

The first electrode 102a includes a metal electrode portion 122 and a metal fixing portion 123. The metal electrode portion 122 is disposed in the dielectric tube 101. The metal fixing portion 123 is fixed to the holding block 121 and is coupled to the power supply 104. The insulator 106 surrounds the metal electrode portion 122 with the space 108 between the insulator 106 and the metal electrode portion 122. The insulator 106 includes an opening 107 through which the space 108 between the insulator 106 and the metal electrode portion 122 communicates with the internal space of the dielectric tube 101. The metal fixing portion 123 includes a screw part 124 on the outer periphery thereof and a through-hole 125 therein. The holding block 121 includes a screw part 126 therein, which is combined with the screw part 124 of the metal fixing portion 123.

Specific examples of the components of the liquid treatment apparatus 100 according to the first embodiment will be described below.

<Dielectric Tube>

For example, the dielectric tube 101 may be formed of a cylindrical silicone hose having an inner diameter of 5 mm. The dielectric tube 101 may be formed of a tubular member having any shape and size. The dielectric tube 101 may have a square or rectangular, triangular, or another polygonal cross section. The material of the dielectric tube 101 is not limited to silicone and may be any plasma-resistant and heat-resistant material. As illustrated in FIG. 1, the water to be treated 109 flows from the upstream side (an arrow 130 in FIG. 1) to the downstream side (an arrow 131 in FIG. 1) in the dielectric tube 101.

The dielectric tube 101 includes the convex-shaped dome 113 projecting outwardly from the inside of the dielectric tube 101, the inner wall face of the convex-shaped dome 113 facing the first electrode 102. The convex-shaped dome 113 can retard degradation of the dielectric tube 101 caused by the plasma 112. The convex-shaped dome 113 can also extend the life of the dielectric tube 101.

The protrusion 113 projects outwardly from the inside of the dielectric tube 101, an inner wall face of the protrusion facing the first electrode 102. The protrusion 113 is not limited to dome-shaped as illustrated in FIG. 1. The ratio of the length to the inner diameter of the dielectric tube 101 may be five or more. The dielectric tube 101 may have an inner diameter of 3 mm or more. In this case, since the inner diameter of the dielectric tube 101 is greater than the site of plasma generation, damage to the dielectric tube 101 due to plasma can be reduced. The dielectric tube 101 may have an inner diameter of 30 mm or less. In this case, the size of the liquid treatment apparatus 100 can be reduced.

<First Electrode>

At least part of the first electrode 102a is disposed in the dielectric tube 101. As illustrated in FIG. 2, the first electrode 102a includes the metal electrode portion 122 and the metal fixing portion 123. The size and material of the metal electrode portion 122 may be different from those of the metal fixing portion 123. For example, the metal electrode portion 122 may have a diameter of 0.95 mm, may have columnar shape, and may be made of tungsten. The metal fixing portion 123 may have a diameter of 3 mm, may have columnar shape, and may be made of iron.

The metal electrode portion 122 may have any diameter, provided that the plasma 112 can be generated. For example, the metal electrode portion 122 has a diameter of 2 mm or less. The shape of the metal electrode portion 122 is not limited to columnar shape. The metal electrode portion 122 in the dielectric tube 101 may be a pillar having substantially a constant diameter from one end to the other end. Unlike tapered needles having a thickness close to zero at its tip, such a structure can prevent an excessive concentration of the electric field at the end of the metal electrode portion 122, and thus can retard degradation in use. The material of the metal electrode portion 122 is not limited to tungsten and may be another plasma-resistant metallic material. For example, the metal electrode portion 122 may be made of copper, aluminum, iron, platinum, or an alloy thereof, although these materials have lower durability than tungsten. Yttrium oxide added with an electronic conductor may be coat on a part of the surface of the metal electrode portion 122 by thermal spraying. Yttrium oxide added with an electronic conductor may have an electric resistivity in the range of 1 to 30 Ωcm. Thermally sprayed yttrium oxide can extend the life of the electrode.

The diameter of the metal fixing portion 123 is not limited to 3 mm and may be greater than the diameter of the metal electrode portion 122. The material of the metal fixing portion 123 may be any metallic material that is easy to process. The material of the metal fixing portion 123 may be a material typically used in screws, such as copper, zinc, aluminum, tin, or brass.

The first electrode 102a may be formed by press-fitting the metal electrode portion 122 into the metal fixing portion 123. The use of the metal electrode portion 122 made of a plasma-resistant material and the metal fixing portion 123 made of an easily processed material can realize the plasma-resistant first electrode 102a that has low manufacturing costs and stable characteristics.

The metal fixing portion 123 may have the through-hole 125 coupled to the gas supply unit 105. The through-hole 125 communicates with the space 108 between the insulator 106 and the metal electrode portion 122, for example. Thus, the gas 110 from the gas supply unit 105 can be supplied to the space 108 through the through-hole 125, allowing the metal electrode portion 122 to be surrounded by the gas 110. The through-hole 125 may be disposed on the lower side of the metal electrode portion 122 in the vertical direction. This enables the metal electrode portion 122 to be easily surrounded by the gas 110 supplied from the gas supply unit 105. The metal fixing portion 123 may have two or more through-holes 125. With their through-holes 125, the pressure loss of the through-hole 125 can be reduced. The through-hole 125 may have a diameter of 0.3 mm. The shape and size of the through-hole 125 are not limited to these.

The metal fixing portion 123 may include the screw part 124 on the outer periphery thereof. When the screw part 124 is a male screw, the holding block 121 may have a female screw as a screw part 126. The first electrode 102a may be fixed to the holding block 121 by combining the screw part 124 with the screw part 126. The position of an end surface of the metal electrode portion 122 can be precisely adjusted to the opening 107 of the insulator 106 by rotating the metal fixing portion 123. The metal fixing portion 123 can be coupled and fixed to the power supply 104 through the screw part 124. This can stabilize the contact resistance between the power supply 104 and the first electrode 102a and thus stabilize the characteristics of the first electrode 102a. When a gas supplier (not shown) is coupled and fixed to the first electrode 102a with the screw part 126, the gas supply unit 105 can be securely coupled to the first electrode 102a. Such a design is useful for waterproofing and safety measures in practical use.

The longitudinal direction of first electrode 102a may be oriented to any direction relative to the flow direction (the arrow 131 in FIG. 1) of the water to be treated 109 in the dielectric tube 101. For example, as illustrated in FIG. 1, the longitudinal direction of the first electrode 102a may be perpendicular to the flow direction (the arrow 131 in FIG. 1) of the water to be treated 109 in the dielectric tube 101. The placement of the first electrode 102a in this direction can prevent a gas bubble 111 from staying around the first electrode 102a. The gas bubble 111 may be formed of the gas 110 supplied from the gas supply unit 105.

<Insulator>

The insulator 106 forms the space 108 around the metal electrode portion 122 of the first electrode 102a. The space 108 is supplied with the gas 110 from the gas supply unit 105. The gas 110 surrounds the metal electrode portion 122. Thus, the outer peripheral surface of the metal electrode portion 122 does not come into direct contact with the water to be treated 109, even though an exposed conductor part of the metal electrode portion 122 is exposed on the peripheral surface of the metal electrode portion 122. The insulator 106 may have an inner diameter of 1 mm and may be cylindrical. The size and shape of the insulator 106 are not limited to these.

The insulator 106 has the opening 107. The opening 107 has the function of determining the size of the gas bubble 111 released into the water to be treated 109 in the dielectric tube 101. The insulator 106 may be made of a material, such as an alumina ceramic (aluminum oxide), magnesium oxide, yttrium oxide, an insulative plastic, glass, or quartz.

The opening 107 may be disposed on an end surface of the insulator 106, as illustrated in FIG. 2, or on a side surface of the insulator 106. The position of the opening 107 is not particularly limited. The insulator 106 may have a plurality of openings 107. The opening 107 of the insulator 106 may have a diameter of 1 mm and may be circular. The size and shape of the opening 107 are not limited to these.

<Power Supply>

The power supply 104 is configured to apply a voltage between the first electrode 102a and the second electrode 103. The power supply 104 can apply a pulse or alternating voltage between the first electrode 102a and the second electrode 103. The voltage waveform may be a pulse, half-sine, or sine waveform. The power supply 104 may alternately apply a positive pulse voltage and a negative pulse voltage (a bipolar pulse voltage). For example, the power supply 104 may have an output capacity of 80 VA and a no-load peak voltage of 10 kV.

<Gas Supply Unit>

The gas supply unit 105 is coupled to the metal fixing portion 123 of the first electrode 102a. The gas supply unit 105 supplies the gas 110 to the space 108 through the through-hole 125 in the metal fixing portion 123. The gas 110 may be air, He, Ar, or $O_2$. The amount of gas supplied from the gas supply unit 105 is not particularly limited. The amount of gas supplied from the gas supply unit 105 may be 1 liter/min. The gas supply unit 105 may include a pump. As illustrated in FIG. 2, the gas 110 from the gas supply unit 105 forms the gas bubble 111, which surrounds the exposed conductor part of the first electrode 102a.

<Holding Block>

The holding block 121 is coupled to the metal fixing portion 123 of the first electrode 102a and the insulator 106. The holding block 121 may have a structure for sealing a joint between the holding block 121 and the first electrode 102a and/or a joint between the holding block 121 and the insulator 106 in order to prevent leakage of the water to be treated 109. For example, the holding block 121 may include the screw part 126 for fixing the metal fixing portion 123 of the first electrode 102a with screws. The holding block 121 may include a screw part (not shown) for fixing the insulator 106 with screws. The sealing structure is not limited to this and may be any structure.

<Second Electrode>

At least part of the second electrode 103 is disposed in the dielectric tube 101. The second electrode 103 may have a diameter of 1 mm, may have columnar shape, and may be made of tungsten. The shape, size, and material of the second electrode 103 are not limited to these. The second electrode 103 may be made of any conductive metallic material. Like the first electrode 102a, the second electrode 103 may be made of iron, tungsten, copper, aluminum, platinum, or an alloy containing at least one of these metals.

The distance between the first electrode 102a and the second electrode 103 may be 10 mm. The distance between the first electrode 102a and the second electrode 103 is not limited to this, and may be any distance at which the plasma 112 can be generated. With a decrease in inner diameter of the dielectric tube 101, the resistance of the electrical pathway between the first electrode 102a and the second electrode 103 tends to increase, and thus the occurrence of discharge between the electrodes tends to decrease. Thus, the distance between the electrodes depends on the inner diameter of the dielectric tube 101. For example, the distance between the first electrode 102a and the second electrode 103 may be 1 mm or more and 15 mm or less. When the dielectric tube 101 has an inner diameter of 5 mm, for example, the distance between the first electrode 102a and the second electrode 103 may be 5 mm or more and 15 mm or less.

The second electrode 103 may be disposed upstream of the first electrode 102a in the dielectric tube 101, as illustrated in FIG. 1. Such an arrangement allows the plasma 112 to be efficiently generated.

As described above, the distance between the first electrode 102a and the second electrode 103 is small enough to discharge electricity in the dielectric tube 101 (for example, 15 mm or less). The flow path in the dielectric tube 101 is more easily filled with the gas bubble 111 formed therein than in the case of treatment tanks having large capacities. With a decrease in the distance between the first electrode 102a and the second electrode 103 and/or with an increase in the proportion of the gas bubble 111 in the flow path, the gas bubble 111 surrounding the first electrode 102a is more likely to simultaneously surround the second electrode 103. When the gas bubble 111 simultaneously surrounds the first electrode 102a and the second electrode 103, arc discharge occurs between the electrodes in the gas bubble 111 and makes it difficult to stably generate plasma. Particularly, when the second electrode 103 is disposed downstream of the first electrode 102a, the downsizing of the liquid treatment apparatus 100 with the dielectric tube 101 is more likely to prevent discharge form stably generating plasma. In contrast, when the second electrode 103 is disposed upstream of the first electrode 102a, as illustrated in FIG. 1, the gas bubble 111 formed around the first electrode 102a rarely flows upstream toward the second electrode 103. This prevents the gas bubble 111 from simultaneously surrounding the first electrode 102a and the second electrode 103 and thus realizes stable plasma discharge.

In this disclosure, the clause "the surface of the metal electrode portion 122 does not come into direct contact with the water to be treated 109", means that the surface of the metal electrode portion 122 does not come into contact with a large mass of liquid in the dielectric tube 101. Accordingly, for example, "the metal electrode portion 122 does not come into direct contact with the water to be treated 109" also includes the state in which the surface of the metal electrode portion 122 is wetted with the water to be treated 109 (in the strict sense, the surface of the metal electrode portion 122 is in contact with part of the water to be treated 109) and is surrounded by the gas 110 in the gas bubble 111. Such a state can be created when a gas bubble is formed around the surface of the first electrode wetted with a liquid.

<Liquid Treatment Method>

The operation of the liquid treatment apparatus 100 according to the first embodiment, that is, a liquid treatment method performed using the liquid treatment apparatus 100 according to the first embodiment will be described below.

The dielectric tube 101 is supplied with the water to be treated 109. The water to be treated 109 supplied to the dielectric tube 101 flows from the upstream side (the arrow 130 in FIG. 1) to the downstream side (the arrow 131 in FIG. 1) in the dielectric tube 101.

The gas supply unit 105 supplies the gas 110 to the space 108 between the insulator 106 and the metal electrode portion 122 of the first electrode 102a through the through-hole 125 of the first electrode 102a. The gas 110 is released into the water to be treated 109 in the dielectric tube 101 through the opening 107 of the insulator 106, allowing the gas bubble 111 to be formed around the metal electrode portion 122, or the exposed conductor part, of the first electrode 102a in the water to be treated 109. In other words, the gas bubble 111 is formed through the opening 107 of the insulator 106. Thus, the metal electrode portion 122 of the first electrode 102a is always surrounded by the gas bubble 111 formed of the gas 110.

While the metal electrode portion 122 is surrounded by the gas bubble 111, the power supply 104 applies a voltage between the first electrode 102a and the second electrode 103. The application of a voltage between the first electrode 102a and the second electrode 103 causes discharge in the gas bubble 111. The discharge generates the plasma 112 in the gas bubble 111 around the metal electrode portion 122 of the first electrode 102a. The plasma 112 produces products, such as OH radicals, in the water to be treated 109, the produces sterilizing the water to be treated 109 and/or decomposing chemical substances in the water to be treated 109. The plasma 112 is generated not only in the gas bubble 111 at the end of the first electrode 102a but also in the space 108. This is a consequence of the water to be treated 109 functioning as an opposed electrode through the insulator 106. Also because of this effect, a large number of ions are produced, and a large number of radicals are produced in the water to be treated 109. This is an effect resulting from the first electrode 102a being in the water to be treated 109.

Although the second electrode 103 is disposed upstream of the first electrode 102a in the exemplary arrangement illustrated in FIG. 1, the arrangement of the first electrode 102a and the second electrode 103 is not limited to this. In the exemplary arrangement illustrated in FIG. 1, the longitudinal direction of the first electrode 102a is perpendicular to the flow direction 131 of the water to be treated 109 in the dielectric tube 101. Thus, the gas bubble 111 formed around the first electrode 102a does not come into contact with the second electrode 103. This enables discharge (i.e., glow discharge) to be stably generated with the application of a voltage between the first electrode 102a and the second electrode 103. As a result, the first electrode 102a and the second electrode 103 arranged as illustrated in FIG. 1 can stably generate the plasma 112. In the arrangement of the first electrode 102a and the second electrode 103 illustrated in FIG. 1, the gas bubble 111 does not stay around the first electrode 102a and flows downstream in the dielectric tube 101. Thus, since heat associated with the generation of the plasma 112 can be efficiently dissipated, the arrangement is favorable to cooling.

Although the longitudinal direction of the first electrode 102a is perpendicular to the flow direction 131 of the water to be treated 109 in the dielectric tube 101 in the exemplary arrangement illustrated in FIG. 1, the arrangement of the first electrode 102a is not limited to this. For example, the first electrode 102a in the dielectric tube 101 may be oriented at an angle of 45 degrees relative to the flow direction 131 of the water to be treated 109. The first electrode 102a may be arranged at any angle relative to the flow direction 131 of the water to be treated 109, provided that the gas bubble 111 does not stay around the first electrode 102a.

Although the longitudinal direction of the second electrode 103 is the same as the flow direction 131 of the water to be treated 109 in the dielectric tube 101 in the exemplary arrangement illustrated in FIG. 1, the arrangement of the second electrode 103 is not limited to this. For example, the second electrode 103 may be arranged at any angle relative to the flow direction 131, provided that the second electrode 103 is disposed upstream of the first electrode 102a.

<Experimental Results on Decomposition Rate>

The decomposition rate, which is one of the advantages of the liquid treatment apparatus 100 according to the first embodiment, will be described below.

The experimental results on the decomposition rate will be described below with respect to treatment of a liquid using two type of liquid treatment apparatuses. The liquid treatment apparatus according to Reference Example A includes the dielectric tube 101. The liquid treatment apparatus according to Reference Example B includes a treatment tank instead of the dielectric tube 101. In the experiments, an aqueous indigocarmine solution was treated using each of the liquid treatment apparatuses, and the time to decompose the aqueous indigocarmine solution was measured.

Reference Example A

The liquid treatment apparatus according to Reference Example A had the same structure as illustrated in FIG. 1 except that the dielectric tube 101 had no protrusion 113. Reference Example A included an electrode unit 150a illustrated in FIG. 2. The dielectric tube 101 was formed of a cylindrical silicone hose having an inner diameter of 5 mm. The metal electrode portion 122 of the first electrode 102 had a diameter of 0.95 mm, had columnar shape, and was made of tungsten. The metal fixing portion 123 of the first electrode 102 had a diameter of 3 mm, had columnar shape, and was made of iron. The through-hole 125 in the metal fixing portion 123 of the first electrode 102 had a diameter of 0.3 mm. The insulator 106 had an inner diameter of 1 mm, was cylindrical, and was made of an alumina ceramic (aluminum oxide). The opening 107 of the insulator 106 had a diameter of 1 mm. The second electrode 103 had a diameter of 1 mm, had columnar shape, and was made of tungsten. The distance between the first electrode 102a and the second electrode 103 was 10 mm. The power supply 104 had an output capacity of 80 VA and a no-load peak voltage of 10 kV. The amount of gas supplied from the gas supply unit 105 was 0.2 liters/min.

Reference Example B

Reference Example B will be described below. Reference Example B is different from Reference Example A in that Reference Example B includes the treatment tank having a larger volume than the dielectric tube 101. Reference Example B included the first electrode 102a and the second electrode 103 in the treatment tank filled with the water to be treated 109. The treatment tank of Reference Example B had a volume of 0.2 liters. The other components and conditions of Reference Example B were the same as those of Reference Example A.

Figure 3:
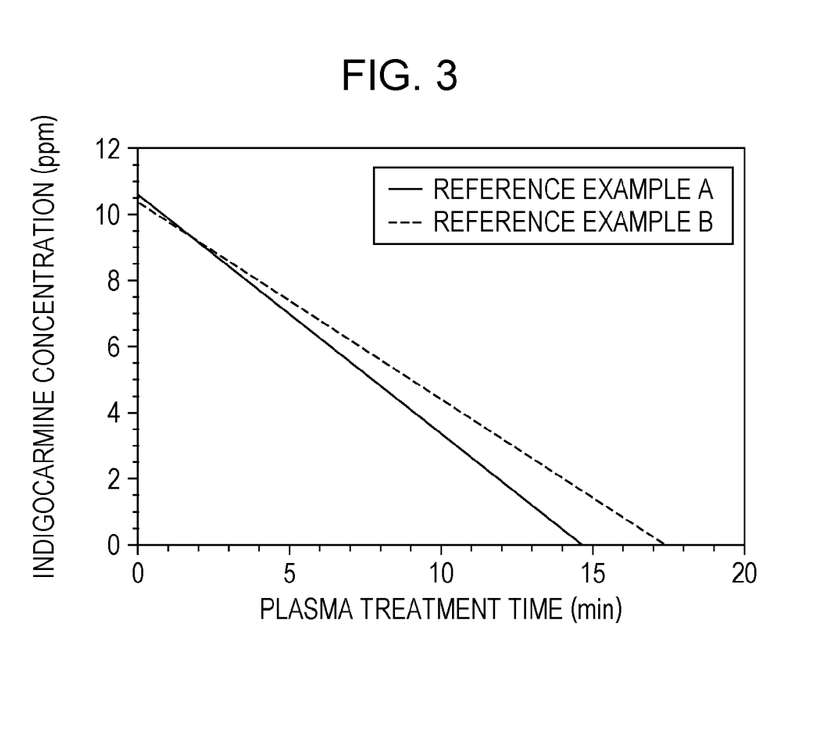
FIG. 3 is a graph of the temporal changes in indigocarmine concentration in liquid treatment apparatuses according to Reference Examples A and B of the present disclosure.

FIG. 3 shows the temporal changes in indigocarmine concentration in a treatment of an aqueous indigocarmine solution using the liquid treatment apparatuses according to Reference Examples A and B. In FIG. 3, the vertical axis indicates the indigocarmine concentration (ppm), and the horizontal axis indicates the time (min). The dotted line represents Reference Example B, and the solid line represents Reference Example A.

FIG. 3 shows that the decomposition rate in Reference Example A was higher than the decomposition rate in Reference Example B. This is probably because the contact between OH radicals produced by the plasma 112 and indigocarmine in the water to be treated 109 is easier in Reference Example A than in Reference Example B. The details will be described below.

First, Reference Example B will be described below. In Reference Example B, the water to be treated 109 in the treatment tank was treated. In Reference Example B, when the gas bubble 111 was formed in the water to be treated 109 in the treatment tank, the plasma 112 was generated in the gas bubble 111, causing OH radicals to be produced in the water to be treated 109. In Reference Example B, however, the contact between the OH radicals and indigocarmine in the water to be treated 109 in the treatment tank tended to occur in the vicinity of the first electrode 102a around which the plasma 112 was generated, and the contact rarely occurred in the other portion. Thus, the reaction between the OH radicals and indigocarmine in the water to be treated 109 in the treatment tank occurred locally in Reference Example B, and thus the water to be treated 109 sometimes could not be efficiently treated.

Reference Example A will be described below. In Reference Example A, the water to be treated 109 flowing through the dielectric tube 101 having an inner diameter of 5 mm was treated. In Reference Example A, a greater number of the gas bubbles 111 were present downstream of the first electrode 102a in the flow path within the dielectric tube 101. In Reference Example A, therefore, the water to be treated 109 flowing downstream of the first electrode 102a could easily come into contact with the gas bubble 111. Thus, the OH radicals probably came into contact with indigocarmine in the water to be treated 109 in the vicinity of the interface between the water to be treated 109 and the gas bubble 111. This probably promoted the reaction between the OH radicals and indigocarmine in the water to be treated 109 in Reference Example A, resulting in a higher decomposition rate in Reference Example A than in Reference Example B.

The liquid treatment apparatus 100 according to the first embodiment has the protrusion 113 in the dielectric tube 101 according to Reference Example A. Thus, like Reference Example A, the liquid treatment apparatus 100 according to the first embodiment can also efficiently produce OH radicals by the plasma 112 and allows the OH radicals to efficiently react with chemical substances and/or germs in the water to be treated 109, thereby treating the water to be treated 109 in a short time.

Second Embodiment

A liquid treatment apparatus according to a second embodiment will be described below.

In the second embodiment, only components different from the components described in the first embodiment are described, and the components described in the first embodiment are not described again.

Figure 4:
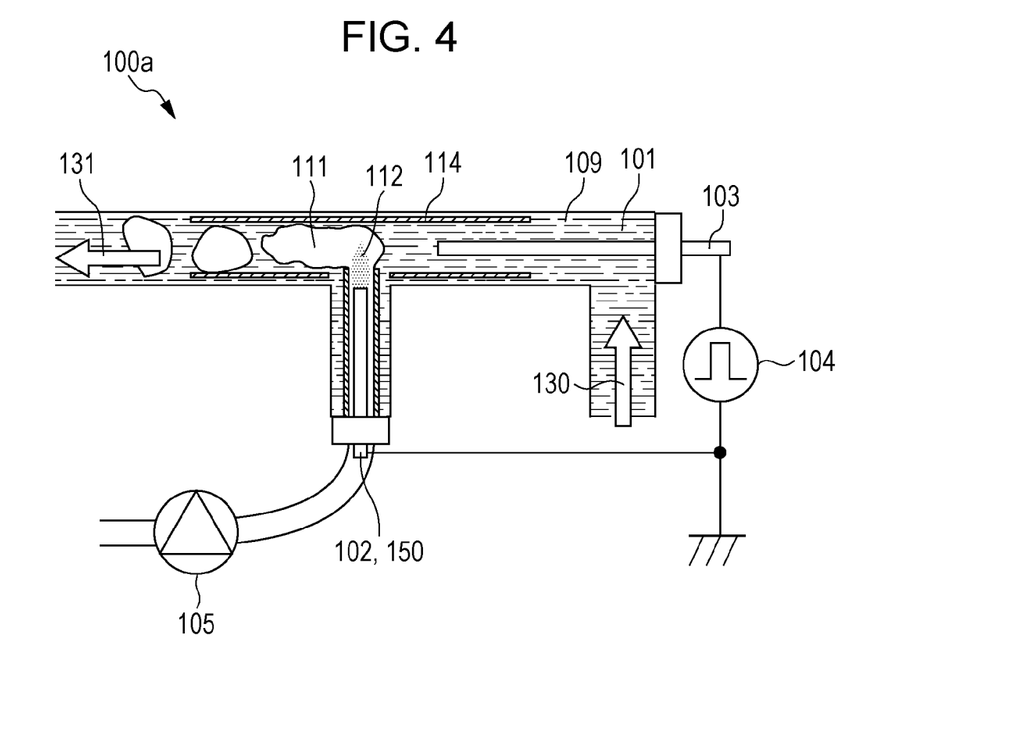
FIG. 4 is a schematic view of an exemplary structure of a liquid treatment apparatus according to a second embodiment of the present disclosure.

FIG. 4 is a schematic view of an exemplary entire structure of a liquid treatment apparatus 100a according to the second embodiment. The liquid treatment apparatus 100a is different from the liquid treatment apparatus according to the first embodiment in that a heat-resistant member 114 instead of the dome 113 is disposed on the inner wall face of the dielectric tube 101. The heat-resistant member 114 may cover a portion between the first electrode 102 and the second electrode 103, that is, the site of generation of the plasma 112. The arrangement of the heat-resistant member 114 is not limited to this, and the heat-resistant member 114 may cover the entire inner wall face of the dielectric tube 101.

<Heat-Resistant Member>

The heat-resistant member 114 may be made of a heat-resistant and plasma-resistant material. For example, a polyimide can be used. The material of the heat-resistant member 114 is not limited to a polyimide and may be another material.

<Advantages>

The heat-resistant member 114 on the inner wall face of the dielectric tube 101 in the liquid treatment apparatus 100a according to the second embodiment can retard degradation of the dielectric tube 101 caused by the plasma 112. The heat-resistant member 114 can also extend the life of the dielectric tube 101.

Third Embodiment

A liquid treatment apparatus according to a third embodiment will be described below.

In the third embodiment, only components different from the components described in the first embodiment are described, and the components described in the first embodiment are not described again.

Figure 5:
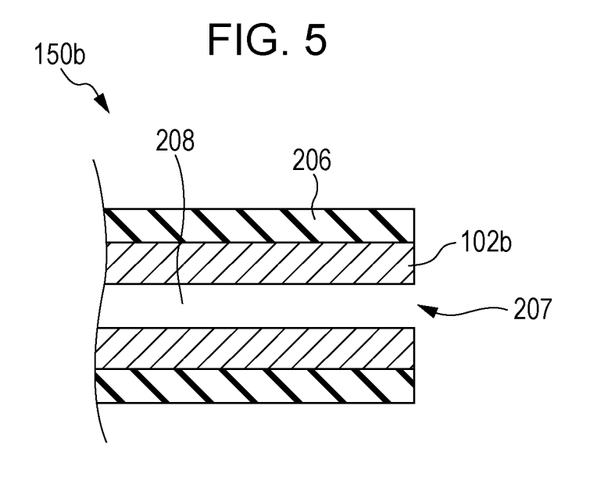
FIG. 5 is a cross-sectional view of an exemplary electrode unit that includes a first electrode in a liquid treatment apparatus according to a third embodiment of the present disclosure.

FIG. 5 is a cross-sectional view of an exemplary electrode unit 150b in the liquid treatment apparatus according to the third embodiment. In the electrode unit 150b that includes a first electrode 102b illustrated in FIG. 5, the shape of the first electrode 102b and the arrangement of an insulator 206 are different from those in the first embodiment. Except for these, the structure of the third embodiment is the same as the structure of the first embodiment. The electrode unit 150b according to the third embodiment will be described below.

<Structure of Electrode Unit>

As illustrated in FIG. 5, the electrode unit 150b according to the third embodiment includes the first electrode 102b and the insulator 206. The first electrode 102b is formed of a tubular metallic material. The first electrode 102b may have an inner diameter of 0.4 mm and an outer diameter of 0.6 mm, for example. The first electrode 102b includes an opening 207 at the end thereof and a hallow space 208 therewithin. The insulator 206 is in contact with an outer peripheral surface of the first electrode 102b, and there is no gap between the insulator 206 and the first electrode 102b. On one end surface and the inner peripheral surface of the first electrode 102b, the metal thereof is exposed. Since the insulator 206 is disposed on the outer peripheral surface of the first electrode 102b with no space therebetween, the insulator 206 prevents the outer peripheral surface of the first electrode 102b from directly coming into contact with the water to be treated 109. The insulator 206 may have a thickness of 0.1 mm, for example.

<Liquid Treatment Method>

The operation of the liquid treatment apparatus according to the third embodiment, that is, a liquid treatment method performed using the liquid treatment apparatus according to the third embodiment will be described below.

The dielectric tube 101 is supplied with the water to be treated 109. The water to be treated 109 supplied to the dielectric tube 101 flows from the upstream side (the arrow 130 in FIG. 1) to the downstream side (the arrow 131 in FIG. 1) in the dielectric tube 101.

The gas supply unit 105 supplies the gas 110 to the hollow space 208 of the first electrode 102b. The gas 110 is released into the water to be treated 109 in the dielectric tube 101 through the opening 207 of the first electrode 102b, and thereby forms the gas bubble 111 that surrounds the opening 207 of the first electrode 102b in the water to be treated 109. The gas bubble 111 extends a certain distance from the opening 207 of the first electrode 102b. In the third embodiment, therefore, the opening 207 of the first electrode 102b functions as a gas bubble generator. The amount of the gas 110 supplied from the gas supply unit 105 can be controlled such that the gas of the gas bubble 111 can cover the periphery of the opening 207 of the first electrode 102b, that is, the end surface of the first electrode 102b at which the metal is exposed. The gas bubble 111 covering the end surface of the first electrode 102b is defined not only by the gas-liquid interface between the gas 110 of the gas bubble 111 and the water to be treated 109 but also by the interface between the gas 110 of the gas bubble 111 and the insulator 206. Thus, the gas-liquid interface that defines the gas bubble 111 is not "closed" in the water to be treated 109. The gas bubble 111 comes into contact with the insulator 206 in the vicinity of the opening 207 of the first electrode 102b. As described above, the conductor on the outer surface of the first electrode 102b is exposed only at the end surface in the vicinity of the opening 207. While the gas bubble 111 covers the end surface of the first electrode 102b, the outer surface of the first electrode 102b from the water to be treated 109 is isolated by the gas bubble 111 and the insulator 206. While the gas bubble 111 is formed thorough the hollow space 108 of the first electrode 102b, the inner peripheral surface of the first electrode 102b is covered with the gas 110, and therefore the inner surface thereof does not directly come into contact with the water to be treated 109.

The power supply 104 applies a voltage between the first electrode 102b and the second electrode 103. The application of a voltage between the first electrode 102b and the second electrode 103 causes discharge in the gas bubble 111, thereby generating plasma in the vicinity of the first electrode 102b. Plasma spreads over the gas bubble 111. In particular, a high concentration of plasma 112 is generated in the vicinity of the first electrode 102b. Since plasma is also generated in the hollow space 208 of the first electrode 102b, not only the end of the first electrode 102b but also the entire electrode can be effectively used.

<Advantages>

The liquid treatment apparatus according to the third embodiment, which includes the electrode unit 150b including the first electrode 102b and the gas supply unit 105 for supplying the gas 110 to the hollow space 208 of the first electrode 102b, can produce the gas bubble 111 through the opening 207 of the first electrode 102b. The liquid treatment apparatus according to the third embodiment can discharge electricity in the gas bubble 111 to generate the plasma 112, causing OH radicals to be produced. Thus, the third embodiment can also efficiently generate the plasma 112 in the gas bubble 111 and thus treat the water to be treated 109 in a short time.

Fourth Embodiment

Figure 6:
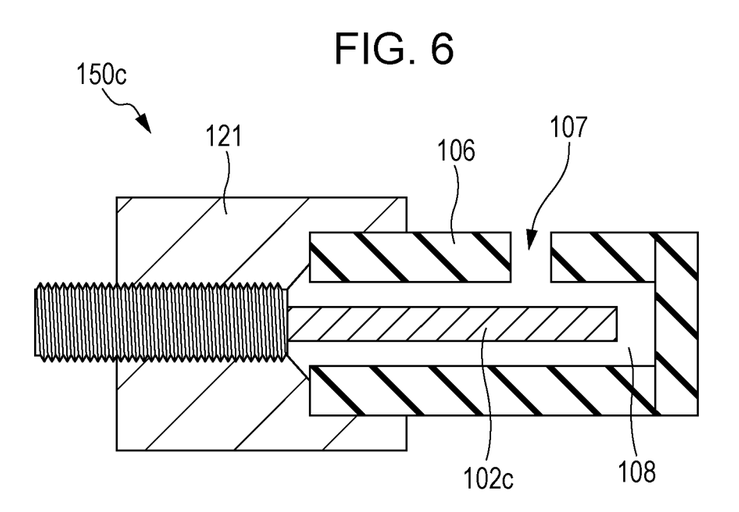
FIG. 6 is a cross-sectional view of an exemplary electrode unit that includes a first electrode in a liquid treatment apparatus according to a fourth embodiment of the present disclosure.

A liquid treatment apparatus according to a fourth embodiment is different from the liquid treatment apparatus according to the first embodiment in that an electrode unit 150c includes no gas supply unit. The electrode unit 150c is composed of the first electrode 102c, the insulator 106, the second electrode 103, and the holding block 121.

FIG. 6 is a cross-sectional view of an exemplary electrode unit 150c that includes the first electrode 102c according to the fourth embodiment. As illustrated in FIG. 6, the electrode unit 150c includes the insulator 106 such that the space 108 is formed around the first electrode 102c. The insulator 106 has at least one opening 107 through which the interior of the dielectric tube 101 communicates with the space 108. The water to be treated 109 in the dielectric tube 101 enters the space 108 through the opening 107 to fill the space 108. One end of the first electrode 102c and one end of the insulator 106 are fixed to the holding block 121. The second electrode 103 may be disposed at any position in the dielectric tube 101.

<Advantages>

In the liquid treatment apparatus according to the fourth embodiment, as illustrated in FIG. 6, when the power supply 104 applies a voltage between the first electrode 102c and the second electrode 103, a gas is produced by vaporization of the water to be treated 109 in the space 108. The gas in the space 108 is released into the water to be treated 109 through the opening 107 of the insulator 106 to form a gas bubble. The application of a voltage between the first electrode 102c and the second electrode 103, when the gas bubble passes through the opening 107, causes discharge in the gas bubble to generate the plasma 112. Thus, OH radicals can be produced in the gas made from the water to be treated 109 while producing less impurities, as compared with the case where a gas is supplied from another source. As a result, in the liquid treatment apparatus according to the fourth embodiment, the water to be treated 109 can be treated in a short time.

Each of the liquid treatment apparatuses according to the first to fourth embodiments includes the first electrode and the second electrode in the dielectric tube through which water to be treated flows. The second electrode may be disposed upstream of the first electrode. A power supply may be disposed between the first electrode and the second electrode. The power supply can apply a voltage between the first electrode and the second electrode while an exposed conductor part of the first electrode is surrounded by a gas bubble formed in the water to be treated in the dielectric tube, and thereby efficiently generate plasma in the gas bubble.

Thus, a liquid treatment apparatus having such a structure can efficiently kill germs in water to be treated using OH radicals produced by plasma, and thus treat the liquid in a short time.

Since a liquid treatment apparatus according to the present disclosure can treat water to be treated while the water flows through a dielectric tube, the size of the liquid treatment apparatus can be reduced as compared with liquid treatment apparatuses that include a treatment tank.

In a liquid treatment apparatus according to the present disclosure, the structure of an electrode unit including a first electrode is not limited to the structures according to the first to fourth embodiments, and may be another structure. For example, the electrode unit including the first electrode is not limited to the electrode structures according to the first to fourth embodiments, and may be another structure that can produce radicals by plasma generated in a liquid.

Although a first electrode of a liquid treatment apparatus according to the present disclosure is disposed perpendicular to the liquid flow direction in a dielectric tube, the first electrode may be oriented at any angle relative to the liquid flow direction in the dielectric tube.

A liquid treatment apparatus according to the present disclosure can be useful in water purifying apparatuses, air conditioners, humidifiers, electric shaver washers, dish washers, treatment apparatuses for hydroponics, apparatuses for circulating nourishing solution, water washing toilet seats, water purifiers, washing machine, pots, and air cleaners.

While the present disclosure has been described with respect to exemplary embodiments thereof, it will be apparent to those skilled in the art that the disclosure may be modified in numerous ways and may assume many embodiments other than those specifically described above. Accordingly, it is intended by the appended claims to cover all modifications of the disclosure that fall within the true spirit and scope of the disclosure.

What is claimed is:

1. A liquid treatment apparatus, comprising: a dielectric tube through which water to be treated flows; a first electrode, at least one end of which is disposed in the dielectric tube; a second electrode made of a conductive metallic material, at least one end of the second electrode being disposed in the dielectric tube, the second electrode being disposed entirely on an upstream side of a flow path of the water relative to the first electrode, the conductive metallic material of the second electrode being adapted to be in direct contact with the water to be treated; a power supply for applying a voltage between the first electrode and the second electrode; and a heat-resistant member covering at least a portion of an inner wall face of the dielectric tube, the portion facing the first electrode, the heat-resistant member having a facing part which covers the portion, the facing part being spaced apart from the first electrode, wherein the water flows through a space between the facing part and the first electrode.

2. The liquid treatment apparatus according to claim 1, wherein the heat-resistant member is spaced apart from the first electrode and the second electrode, and the heat-resistant member is disposed on a downstream side of the flow path of the water relative to the second electrode.

3. The liquid treatment apparatus according to claim 1, wherein the flow path of the water to be treated in the dielectric tube is perpendicular to a longitudinal axis of the first electrode.

4. The liquid treatment apparatus according to claim 1, wherein the power supply applies the voltage between the first electrode and the second electrode, to generate plasma.

5. The liquid treatment apparatus according to claim 1, wherein the power supply applies the voltage between the first electrode and the second electrode while the first electrode is surrounded by a gas bubble formed in the water to be treated, causing discharge to generate plasma in the gas bubble.

6. The liquid treatment apparatus according to claim 5, wherein the dielectric tube allows the gas bubble to flow from upstream to downstream of the flow path of the water to be treated.

7. The liquid treatment apparatus according to claim 1, further comprising:
- an insulator disposed in the dielectric tube, the insulator surrounding a periphery of the first electrode with a space therebetween, the insulator having an opening through which the space communicates with an internal space of the dielectric tube; and
- a gas supply unit which supplies a gas to the space and forms a gas bubble in the water to be treated through the opening.

8. The liquid treatment apparatus according to claim 1, wherein
- the first electrode has a tubular shape with an opening through which a hollow space of the first electrode communicates with an internal space of the dielectric tube,
the liquid treatment apparatus further comprising:
- an insulator in contact with a peripheral surface of the first electrode, and
- a gas supply unit which supplies a gas to the hollow space of the first electrode and forms a gas bubble in the water to be treated through the opening.

9. The liquid treatment apparatus according to claim 1, further comprising:
- an insulator disposed in the dielectric tube, the insulator surrounding a periphery of the first electrode with a space therebetween, the insulator having an opening through which the space communicates with an internal space of the dielectric tube,
- wherein the power supply applies the voltage between the first electrode and the second electrode, vaporizing the water to be treated in the space to produce a gas bubble.

10. The liquid treatment apparatus according to claim 5, wherein the gas bubble flows from upstream to downstream of the flow path of the water to be treated.

11. The liquid treatment apparatus according to claim 3, wherein the longitudinal axis of the first electrode crosses the portion of the inner wall covered by the heat-resistant member.

12. The liquid treatment apparatus according to claim 1, wherein the dielectric tube includes:
- a main tube extending in parallel with a longitudinal axis of the second electrode; and
- a branch tube connected to a joint portion of the main tube on a downstream side of the flow path of the water relative to the second electrode,
- the at least one end of the first electrode is disposed in the branch tube,
- the at least one end of the second electrode is disposed in the main tube, and
- the portion faces the joint portion.

13. The liquid treatment apparatus according to claim 7, wherein the dielectric tube includes:
- a main tube extending in parallel with a longitudinal axis of the second electrode; and
- a branch tube connected to a joint portion of the main tube on a downstream side of the flow path of the water relative to the second electrode,
- the at least one end of the first electrode is disposed in the branch tube,
- the at least one end of the second electrode is disposed in the main tube,
- the portion faces the joint portion, and
- the insulator projects from the branch tube into the main tube through the joint portion.

14. The liquid treatment apparatus according to claim 1, wherein a part of the heat-resistant member surrounds an outer peripheral surface of one end of the second electrode.

15. The liquid treatment apparatus according to claim 1, wherein
- the heat-resistant member is disposed on and along at least the portion of the inner wall face of the dielectric tube, and
- the heat-resistant member surrounds a part of the flow path of the water.

16. The liquid treatment apparatus according to claim 15, wherein the facing part of the flow path includes a space extending from the second electrode to the first electrode.

17. The liquid treatment apparatus according to claim 1, wherein the first electrode and the second electrode each have a pillar shape with a constant diameter from one end to another end.

18. The liquid treatment apparatus according to claim 1, wherein the first electrode and the second electrode are fixed electrodes, respectively.

19. The liquid treatment apparatus according to claim 1, wherein the facing part faces the first electrode in a facing direction that is perpendicular to a flow direction in which the water flows through the space.

* * * * *